US012286312B2

United States Patent
Biondi et al.

(10) Patent No.: US 12,286,312 B2
(45) Date of Patent: Apr. 29, 2025

(54) CLAMP DEVICE AND RELATED TRANSFER APPARATUS

(71) Applicant: G.D S.P.A., Bologna (IT)

(72) Inventors: Andrea Biondi, Bologna (IT); Luca Cavazza, Bologna (IT); Umberto Zanetti, Bologna (IT); Enrico Campagnoli, Bologna (IT); Antonio Gigante, Bologna (IT); Giacomo Noferini, Bologna (IT); Cristian Dakessian, Bologna (IT)

(73) Assignee: G.D S.P.A., Bologna (IT)

( * ) Notice: Subject to any disclaimer, the term of this patent is extended or adjusted under 35 U.S.C. 154(b) by 0 days.

(21) Appl. No.: 17/998,647

(22) PCT Filed: Jul. 26, 2021

(86) PCT No.: PCT/IB2021/056710
§ 371 (c)(1),
(2) Date: Nov. 11, 2022

(87) PCT Pub. No.: WO2022/023926
PCT Pub. Date: Feb. 3, 2022

(65) Prior Publication Data
US 2023/0348204 A1 Nov. 2, 2023

(30) Foreign Application Priority Data
Jul. 31, 2020 (IT) .......................... 102020000018796

(51) Int. Cl.
*B65G 47/86* (2006.01)
(52) U.S. Cl.
CPC .................................. *B65G 47/847* (2013.01)
(58) Field of Classification Search
CPC ..................................................... B65G 47/847
(Continued)

(56) References Cited

U.S. PATENT DOCUMENTS 2,415,997 A * 2/1947 Eldred ...................... B25J 11/00
198/470.1
4,817,780 A * 4/1989 Davidsson ................ F16B 1/00
198/465.4
(Continued)

FOREIGN PATENT DOCUMENTS

EP 2881345 B1 6/2015
EP 3536638 A1 9/2019
(Continued)

OTHER PUBLICATIONS

International Search Report and Written Opinion for International Application No. PCT/IB/2021/056710 filed on Jul. 26, 2021 on behalf of G.D S.P.A. Mail Date: Oct. 5, 2021, 11 pages.

*Primary Examiner* — James R Bidwell
(74) *Attorney, Agent, or Firm* — Steinfl + Bruno LLP

(57) ABSTRACT

A pincer device for gripping and releasing articles from an operating station to a subsequent station, capable of operating, in a transfer apparatus, with a minimum footprint, without interfering with other pincer devices arranged at close range thereto, is presented. The pincer device has a pair of gripping claws, cooperating with each other and having each a proximal end and a distal end, a gripping edge facing the gripping edge of the other gripping claw, and a longitudinal development following a predefined respective direction. The pincer device also has a driving mechanism, having at least one rotary actuator connected to a respective proximal end, configured to rotate each gripping claw from a gripping position to a release position by rotating each gripping claw about a rotation axis parallel to the predefined direction. In the gripping position, the gripping edges have a minimum spacing therebetween, progressively increasing towards the release position.

8 Claims, 6 Drawing Sheets

(58) Field of Classification Search
USPC .......................................... 198/476.1, 470.1
See application file for complete search history.

(56) References Cited

U.S. PATENT DOCUMENTS

| | | | | |
|---|---|---|---|---|
| 4,938,337 | A * | 7/1990 | Jowitt | C25D 13/14 |
| | | | | 198/470.1 |
| 5,074,397 | A * | 12/1991 | Mukai | G01N 21/9009 |
| | | | | 198/802 |
| 6,269,936 | B1 * | 8/2001 | Schnutt | B21F 33/04 |
| | | | | 198/470.1 |

FOREIGN PATENT DOCUMENTS

| | | |
|---|---|---|
| JP | H07 97044 A | 4/1995 |
| WO | 2018/130266 A1 | 7/2018 |

* cited by examiner

CLAMP DEVICE AND RELATED TRANSFER APPARATUS

CROSS REFERENCE TO RELATED APPLICATIONS

The present application is the U.S. National Stage Entry of International Patent Application No. PCT/IB2021/056710, filed on Jul. 26, 2021, which in turn, claims priority to Italian Application No. IT 102020000018796, filed on Jul. 31, 2020.

The present invention relates to a pincer device for gripping and releasing articles in a transfer step from an operating station to a subsequent one, and to a transfer apparatus employing a plurality of such pincer devices, in particular in an apparatus and in a packaging process.

The present invention finds a preferred, though not exclusive, application in the field of packaging capsules for products by infusion, for example coffee, a field to which reference may be made hereafter without loss in generality.

In particular, in the relevant technical field, transfer devices are known for gripping and transferring articles of various kinds, taking into account their shape and their intrinsic fragility, which prevents the use of pincers that exert a too tight grip.

For example, in the case of capsules for infusion type products, the article to be gripped has a flared cup shape, i.e. truncated conical, with a diameter that varies according to the height.

The material that makes up the capsule, if grasped with an excessive grip, could break, or deform, causing potential damage to the content of the capsule itself.

This need to handle the articles to be gripped and transferred with a certain level of delicacy must be combined with the need to provide for a large number of pincer devices, one next to the other, in a respective transfer apparatus, so that a high flow rate of articles can be ensured while optimising the footprint of the transfer apparatus.

In this description and in the accompanying claims as well, certain terms and expressions are deemed to have, unless otherwise expressly indicated, the meaning expressed in the following definitions.

Herein and in the following, an article is defined as an element formed substantially by a single piece that must be transported individually at high speed, with the final aim of transferring it from one packaging station to the subsequent one.

In particular, it is envisaged that these discrete elements, downstream of any machining or extraction process or even pre-forming, are fed onto lines of discrete elements, through which a predetermined spacing between the discrete elements is achieved, allowing the intervention of tools, none of them interfering with discrete elements not being of their competence.

By way of example, an article may consist of a capsule which, in its most general form, comprises an outer casing shaped like a cup, with a truncated cone-shaped flaring of the lateral wall thereof, a bottom and an upper opening, with a content which, by way of example, could include a powder or granulate of an infusion type product, such as a powder or a coffee-based preparation.

This article therefore constitutes the semi-finished product to obtain the final product, i.e. an infusion type capsule that can be used in an infuser device.

Considering that the coffee preparation has been placed in a precise quantity in the capsule, and considering that the capsule may also contain an internal filter, which is connected to the internal surfaces of the capsule, the article requires to be handled with a certain delicacy and that its position remains fixed, i.e. upright vertically on the bottom, because any inclination or jolting could cause part of the internal preparation to come out.

Therefore, during the transfer, the article must be moved without changing the upright position thereof and without shaking or deforming it, and this requirement may suggest that the pincer devices should be moved apart from each other, leading to an inevitable increase in the overall dimensions.

It is understood that discrete elements, as well as receiving elements, are continuously transported when they move with a predetermined speed, possibly variable, i.e. subject to accelerations and decelerations, but never nihil. Continuous feeding and transport are therefore different from step feeding and transport, in which the corresponding discrete elements and/or receiving elements move step-by-step.

"Capsule" means a hollow article of round or cylindrical shape intended to form a container, a casing, with a product in its side, thus possessing a predetermined shape, in which a head and a bottom are identified, and for which it is provided that it is arranged in an upright vertical arrangement with the head facing upwards, which in turn has an opening that can be sealed by a lid at the end of the packaging process.

The capsules will have a substantially truncated conical or truncated pyramidal shape, or equivalent shapes, and the diameter of a section thereof, executed in a plane orthogonal to the longitudinal axis thereof, or the perimeter of such a section equivalent to the diameter, varies with the variation of the position of the section plane along the axis itself, that is with the variation of the spacing between the bottom and the level at which the capsule is grasped by a pincer.

Feeding or transport "in a line" means that discrete articles are supplied in a sequence of articles, which is part of a transfer step.

It is understood that in the line, each article is spaced from the articles preceding and following it with a spacing that may vary during the transfer itself.

The term "pincer device" means a device comprising a pair of jaws or claws that move from a gripping or grasping configuration, in which they are in a position close together and grasp the article therebetween, to a releasing configuration, in which they are in a position far apart from each other and release the article, and vice versa.

"Transport system" or "transport device" means any system designed to transport articles while maintaining their respective singularity, i.e. without them interfering with each other in any way. The same concept also applies to the cup-shaped containers.

"Transport path" refers to the path that is travelled by articles and support devices intended to grip or receive a respective article individually.

The term "closed transport path" means a transport path of the receiving elements developing along a closed line on a substantially horizontal plane, while the term "carousel structure" means a transport device that operates on a closed transport path, letting the articles and the respective pincer devices, or in any case the movable devices therein provided, carry out a so called revolution which, for this reason, should not be confused with the alternated roundtrip motion that is typical for a belt conveyor.

"Transfer apparatus" means an apparatus that is provided to transport articles in a packaging apparatus, moving them from one process station to a subsequent process station, where operations concerning the packaging of the article, i.e. the production thereof, are carried out.

"Transfer wheel" means a device having a carousel structure on the periphery of which transport elements, which may be pincer or tray-like devices, are moved, each provided for the transport of one or more articles.

The Applicant noted that, in packaging processes, the speed of transfer of the articles is crucial to the overall economics of the process, as high production volumes can be achieved with fewer packaging apparatuses.

Furthermore, the Applicant observed that, in addition to the need to proceed as quickly as possible, another important and unavoidable requirement is represented by the fragility of the article being transferred, which may have to be discarded if it is damaged, or if the content thereof is altered or ejected even in small parts.

In addition, the transfer apparatus must have a small footprint, and this must involve the use of a large number of pincer devices on board the transfer apparatus, in a configuration where the pincer devices are arranged at short spacing apart from each other.

These needs are particularly felt at high transfer speeds, when precise and correct positioning of the articles in the target positions represent a critical factor for the economy of the production process.

Furthermore, this need is reinforced when, in a packaging machine, an increase in the process speed is required and which must be managed without any inconvenience or error.

In addition, the apparatus must also be able to manage articles of different formats, without requiring major interventions in the packaging apparatus.

The Applicant also verified that the continuous transfer of articles enables achieving the productivity rates required for this type of apparatus in a packaging apparatus, leading to a reduction in feeding and passage times.

The Applicant found that, in general, the intervention on the movement of the claws of the pincer device represents a promising starting point for the realisation of a pincer device and of a transfer apparatus capable of meeting the above requirements.

The Applicant, however, understood that this requirement is manifested both in the continuous transfer, and also in step advancement, and especially in high-speed transfer this problem requires the adoption of appropriate measures to achieve an adequate handling of the articles.

The Applicant therefore realised that the adoption of particular features, that are useful to position the pincer devices at a close spacing from each other, and to handle the articles without damaging them, can possibly be exploited to grasp, with a single grip, even more than one article, increasing the transfer flow rate without having to proportionally increase the overall dimension of the transfer apparatus.

The Applicant therefore perceived that the adoption, in the pincer device, of claws capable of rotating around a longitudinal rather than transversal axis with respect to the device may make the grasping more gentle, but also insensitive to the small variations in diameter that might depend on a different gripping height.

The Applicant finally found that, by rotating the claws around axes that are located on or are parallel to the gripping plane, it is possible to achieve both the delicacy in handling the articles and the flexibility required.

In particular, in a first aspect thereof, the invention relates to a pincer device for gripping and releasing articles in a transfer step from an operating station to a subsequent station.

Preferably, the pincer device comprises a pair of gripping claws cooperating with each other.

Preferably, each gripping claw has a proximal end, a distal end, and a gripping edge facing the gripping edge of the other gripping claw facing it.

Preferably, the gripping claws have a longitudinal development following a predefined respective direction.

Preferably, the predefined directions define a gripping plane.

Preferably, the pincer device comprises a driving mechanism comprising at least one rotary actuator connected to a respective proximal end of each gripping claw.

Preferably, the rotary actuator is provided to rotate each gripping claw from a gripping position to a releasing position about a rotation axis.

Preferably the rotation axis is parallel to the predefined direction.

Preferably, the rotation axes define a rotation plane that is substantially parallel to the aforesaid gripping plane.

Preferably, in the gripping position, the gripping edges of the gripping claws have a minimum spacing which increases progressively towards said release position.

Thanks to these features, it is possible to realise a pincer device that can operate in a transfer apparatus with a minimum overall footprint, without interfering with other pincer devices placed close thereto.

In addition, the pincer device is able to grip and release the articles to be transferred in a way that does not damage them.

In addition, these features allow the pincer device to be provided to grip, safely and without risk of damage, a number of articles at a time greater than 1, simply by modifying the shape of the gripping claws and keeping the advantages in terms of small footprint intact.

In a second aspect thereof, the invention relates to a transfer apparatus comprising a plurality of pincer devices as outlined above.

Preferably, in the aforesaid transfer apparatus the pincer devices move along a closed path.

Preferably, the closed path has a gripping segment and a release segment.

Preferably, the gripping claws rotate from a release position, in said release segment, to a gripping position in said gripping segment.

Preferably, the griping claws of the pincer devices project outward from said closed path.

In other words, the position of the gripping devices and in particular of the gripping claws in a transfer apparatus allows obtaining a minimal footprint.

In addition, although the gripping devices are placed in a close position, this arrangement does not create any drawbacks in the gripping quality in terms of firmness and delicacy, and also allows several articles to be gripped at the same time.

In a third aspect thereof, the present invention relates to a packaging apparatus comprising a transfer apparatus for articles in accordance with the second aspect of the invention as outlined above.

In at least one of the aforesaid aspects, the present invention may further comprise at least one of the following preferred features.

Preferably, the rotation axes of the gripping claws are substantially parallel to each other.

This further reduces the overall footprint and eliminates the risk of interfering with the gripping claws of a pincer device placed next to and at close spacing.

Preferably, each gripping claw rotates in a direction opposite to that of the other gripping claw.

In this way, the width of the obtainable opening between the gripping claws is maximised without moving them away from each other.

Preferably, the gripping edge of each gripping claw rotates shifting downwards to reach the release position.

In this way, the release action is particularly smooth and jolt-free, and the article is substantially guided downwards towards a receiving element.

Preferably, each rotary actuator comprises, for each gripping claw, a rotary pin defining a respective rotation axis which extends in a direction concordant with the predefined direction of development of the claws.

In this way, each claw does not rotate about an axis that is perpendicular to the plane on which they are located, i.e. about a rotation pin that is perpendicular to their development, as happens in a classic jaw pincer configuration.

Instead, each claw rotates about a longitudinal axis with respect to the extension of the claws, obtaining a considerable reduction of the overall dimensions for each pincer device.

In particular, the direction of longitudinal development of the claws and their rotation axis are substantially parallel or diverge by a minimum angle.

The minimum angle is defined as an angle such that, when the two claws are raised and approached in the gripping position, they are at the shortest spacing from each other, which increases progressively as the claws are rotated substantially around themselves.

Preferably, each gripping edge has at least one recess apt to cooperate with the corresponding recess of the gripping edge facing it to form, in said gripping position, a gripping clamp.

With this expedient, the gripping clamp is at the same time firm but does not cause an excessive constriction of the article being gripped.

Preferably, each gripping edge has two or more of said recesses in a sequence to form two or more gripping clamps gripping and releasing two or more articles at the same time.

In this way, the pincer device can be provided to grip and release two or more articles at the same time.

Preferably, each recess has a profile apt to be connected to the shape of either the article or the articles to be gripped in a predetermined area, making the grip both soft and firm at the same time.

Preferably, said profile is curved, to adapt to different shapes of articles to be gripped, and has an upper support edge, formed on the surface of the gripping claw facing upwards in a gripping position, apt to cooperate in a supporting manner with a projection of the respective article.

Thus, any interference between the gripping claws and the articles to be gripped is further minimised.

Preferably, in the transfer apparatus, the closed path is a circular path formed on a carousel-like transfer wheel having a respective rotary drum, wherein the gripping claws project outward from the circular path in a substantially radial direction.

This carousel-like structure minimises the overall dimension of the transfer apparatus.

Preferably, the transfer apparatus comprises a first transfer wheel, operating as an inlet wheel, and a third transfer wheel, operating as an outlet wheel, provided with pincer devices, with a second transfer wheel that is intermediate between them.

In this way, a device can be provided on the intermediate wheel that performs process operations on the transported articles.

Preferably, the rotary actuator, which is connected to the proximal ends of the gripping claws, is arranged inside a casing, from which said gripping claws branch out frontally, which is arranged on the periphery of the respective transfer wheel.

Preferably, the pincer devices comprise a rotary actuator provided to rotate about a vertical axis, i.e. perpendicular to the plane on which the respective transport path is located, with a movement that can be adjusted to facilitate the transfer of the articles from or to the pincer devices, to accompany the respective transferring or receiving element.

The present invention will hereinafter be described according to a preferred embodiment thereof, which is provided for illustrative and non-limiting purposes with reference to the accompanying drawings in which.

Figure 1:
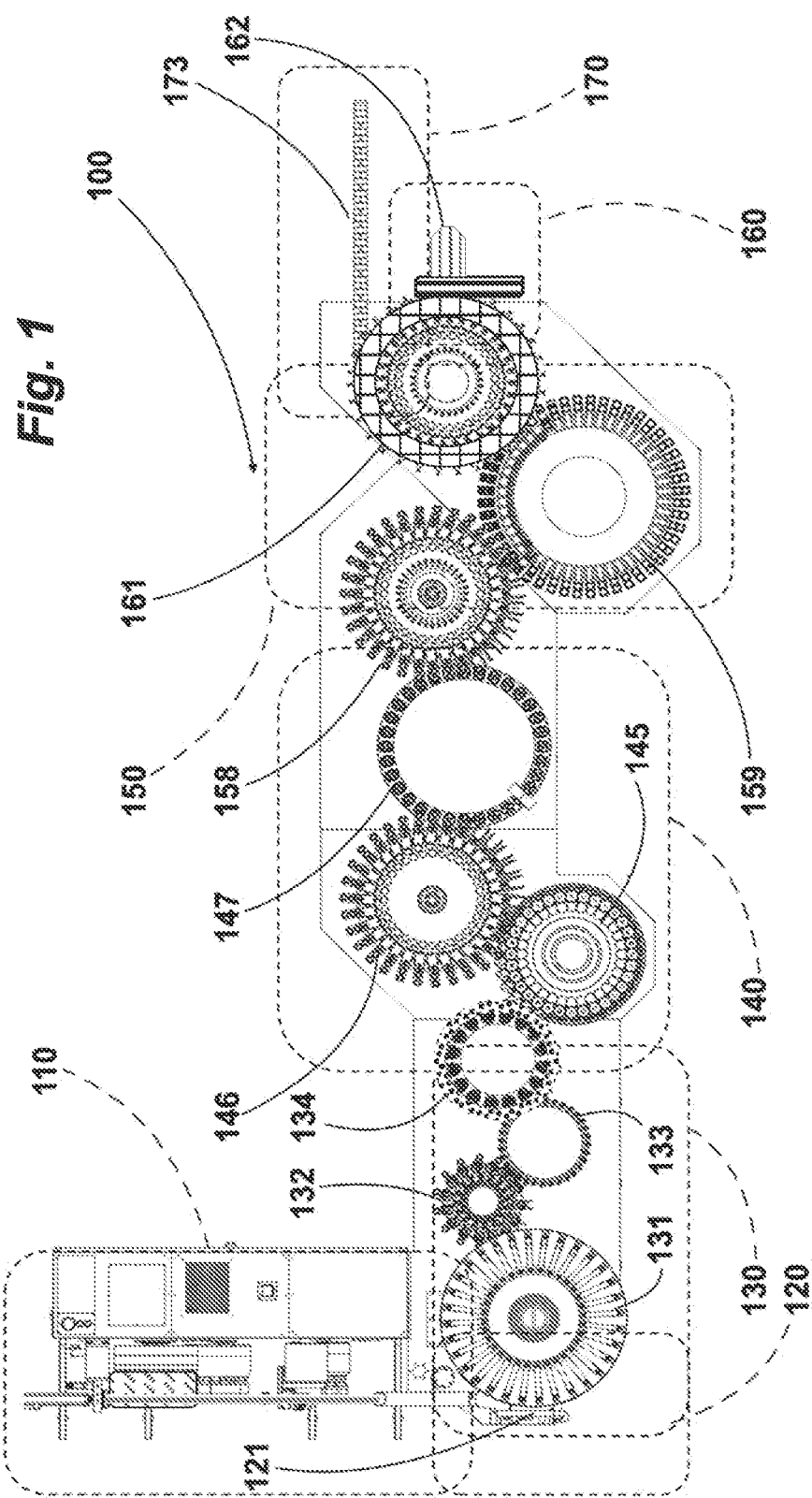
FIG. 1 shows a plan view of an embodiment of a packaging apparatus comprising a discrete element transfer device made according to the present invention.

With reference to the accompanying FIG. 1, a packaging apparatus for capsules for infusion type beverages, such as coffee is referred as 100, mentioned to in the following for short as infusion type capsules.

These infusion type capsules are formed by a substantially rigid cup-shaped container, inside which a filter is arranged. During the subsequent packaging steps, a preparation based on coffee powder is added to the infusion type capsules, and then the capsules are sealed with the application of a lid and sent to a subsequent apparatus where they are boxed for distribution and sale.

In general, the cup-shaped containers are supplied by a feeding station 110, from which they proceed in a line with a continuous motion after being extracted from a set of cup-shaped containers provided by a supplier.

The packaging apparatus 100 comprises a release station 120 of discrete elements, which will be indicated in the following figures by 1, which in the present example comprise flat discs of a material suitable for forming a filter for infusion type products, in particular beverages.

Thus, the release station 120 comprises a release device 121 which in the present example is a device for cutting said discs from a continuous strip of filter material.

The packaging apparatus therefore comprises a filter forming station, indicated by 130, which comprises a carousel type device for producing 131 infusion type capsules 10.

The production device 131 is part of a more complex station, in which said discrete elements 1, once transferred from the release device 121 to the transport device 131, undergo a process for forming the filter, which is then inserted inside the target cup-shaped container, which may possibly contain on its bottom a spacer element inserted inside it in the feeding station 110.

At the end of the step of inserting the filter into the respective cup-shaped container, the filter is fixed, for example by welding, to the internal walls of the cup-shaped container, thus forming the infusion type capsule.

In this connection, the transport device 131 transfers the cup-shaped containers with filters to a first transfer wheel 132, and from this they pass to a filter fixing wheel 133, then to pass to a second transfer wheel 134 which transfers the cup-shaped containers to a filling station 140, where they are filled with a predetermined dose of coffee powder.

In this regard, the filling station comprises a carousel-like filling device 145 from which the cup-shaped containers are transferred, by means of a third transfer wheel 146, to a carousel-like weighing device 147, performing a check on the amount of powder supplied to each container.

The weighing apparatus therefore comprises a second transfer wheel 147, or intermediate wheel, and a weighing device 156, through which the capsules 10 pass in a single line and in a continuous flow.

Upon leaving the weighing device 147, the containers are transferred by a fourth transfer wheel 158 to a sealing station 150. The apparatus 100 thus comprises a cutting station 160 for lids that are formed from a continuous strip by a cutting device 162.

The lids, which are disc-shaped, are transferred, by means of a third transfer device 161, to a sealing device 159, both like a carousel, which receives the infusion type capsules to be sealed from said third wheel 148 and which provides for the extraction of the gases from the capsule and the sealing thereof by applying on the upper opening thereof a disc-shaped lid obtained from continuous strip.

The three transfer wheels 146, 147 and 148 constitute, in the present embodiment, a transfer apparatus indicated as a whole with 200.

Once sealed, the capsules are delivered to said third transport wheel 161 which sends them to an outlet station 170, provided with a linear transport device 173.

Figure 2:
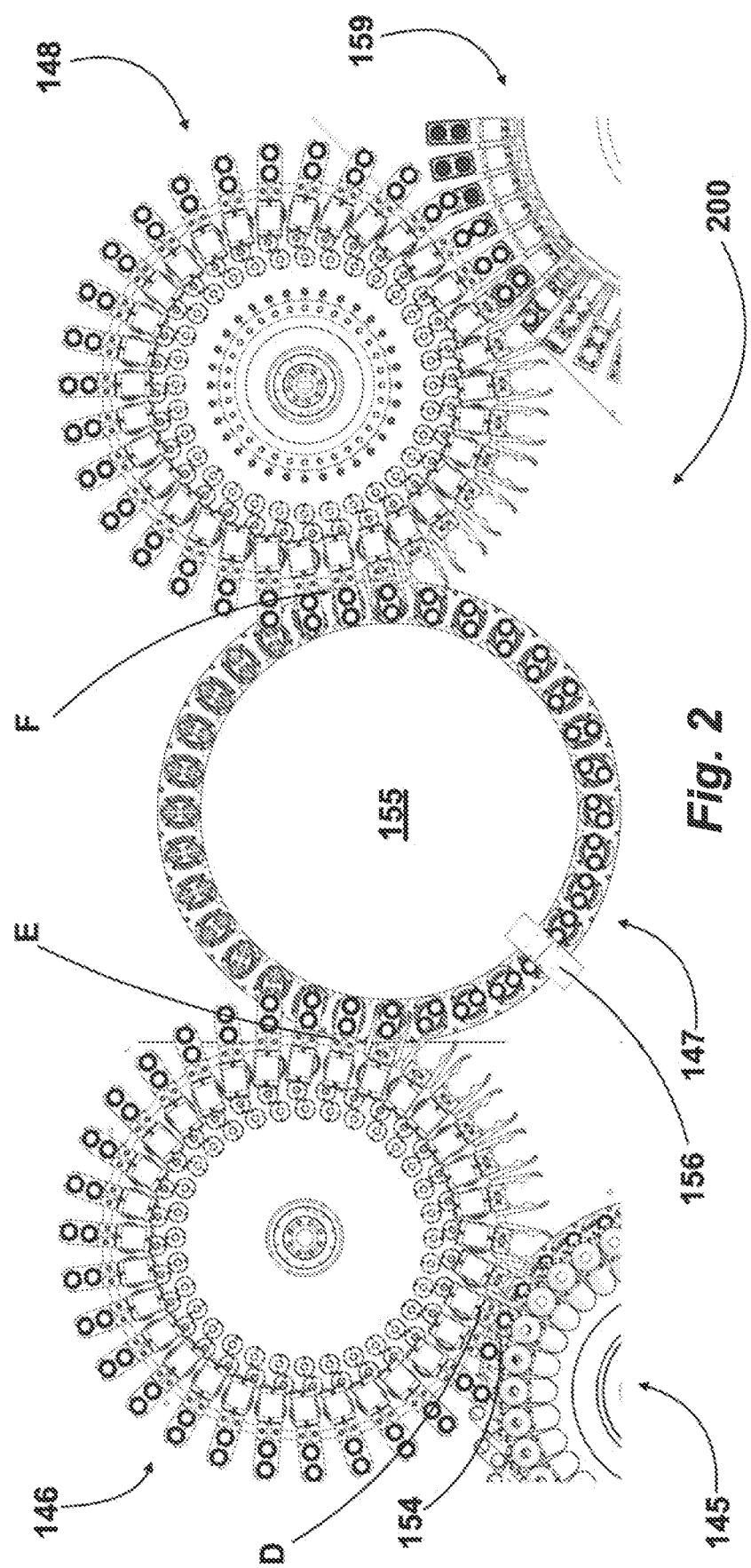
FIG. 2 shows a plan view from above of a transfer apparatus made according to the present invention.

With reference to FIG. 2 onwards, the transfer apparatus 200 is formed by a sequence of transfer wheels, of which the first wheel 146 comprises a respective first drum rotating about a first vertical axis A; in this example, the rotation of the first drum is clockwise in a horizontal plane.

A plurality of first pincer devices 1 are positioned on the periphery of the first rotary drum, which are then transported along a first closed transport path, in particular circular in shape, wherein they receive capsules 10 from the transport system associated with the carousel-like filling device 145, which comprises a plurality of transport elements that are movable along a respective transport path, on which respective capsules 10 are received in a supporting manner on two concentric lines, at least in a release segment 154 wherein the capsules 10 are gripped by the first pincer devices 1.

The first pincer devices 1, which will be described below in greater detail, thus grip as many articles 1 as the lines of capsules 10 that are in said release segment 154. In the present example, as there are two lines, two capsules 10 are gripped in one operation, but they could be one, three or more.

The capsules 10 are transported along a first circular arc path extending from a first inlet end D to a first outlet end E and intersecting a second closed transport path formed on the second transfer wheel 147.

The first outlet end E coincides with the second inlet end of a second circular arc path belonging to the second closed transport path, which ends with a second outlet end F.

Figure 4:
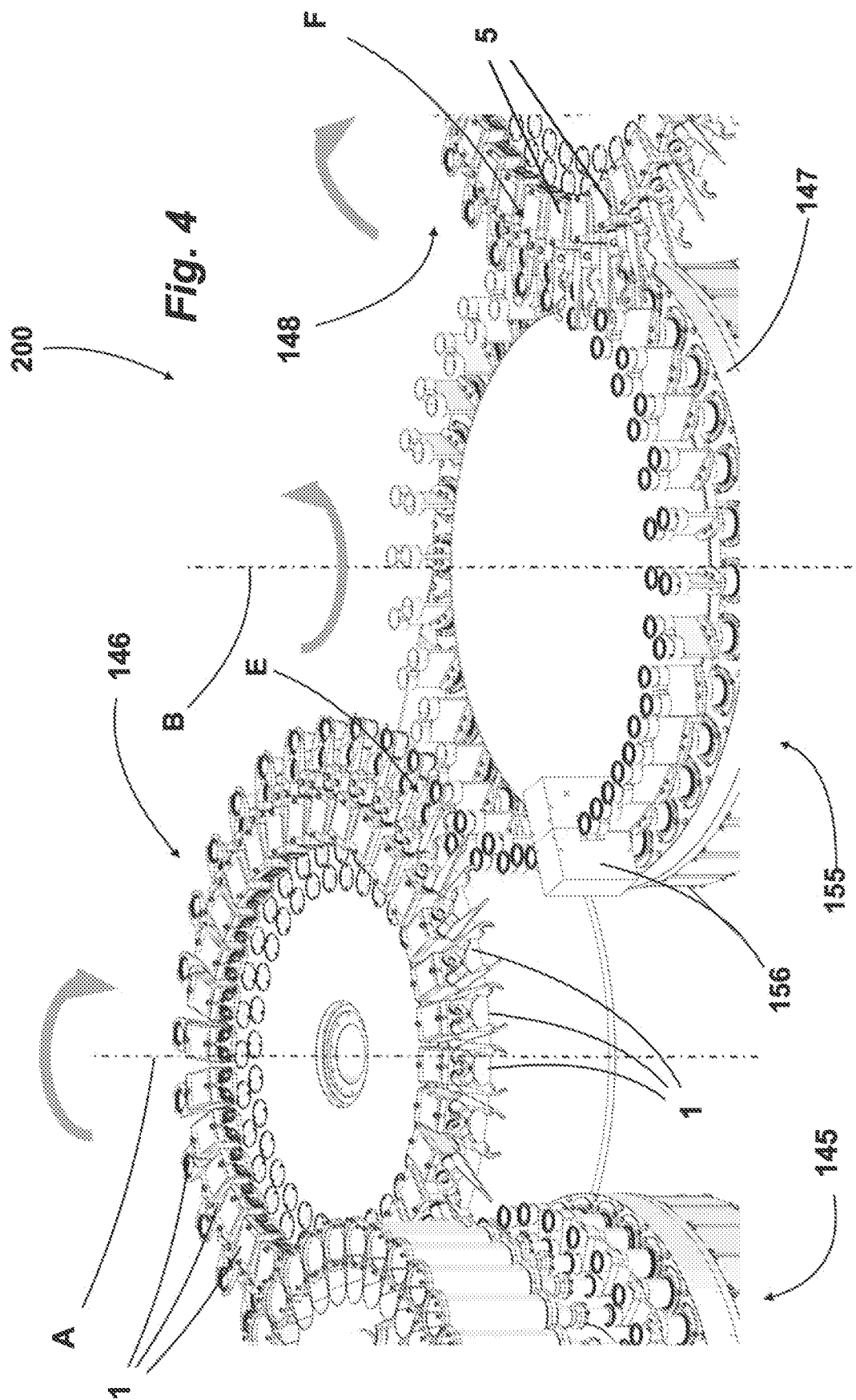
FIG. 4 shows a partial perspective view of the transfer apparatus in FIG. 2, from a second angle.

The second transfer wheel 147 is also of the carousel type and comprises a second rotary drum with a vertical rotation axis B (FIG. 4).

The second closed transport path concerns a plurality of tray-like elements 2, apt to receive in a supporting manner respective capsules 10; the tray-like elements are arranged on the periphery of the second rotary drum which rotates, in this embodiment, counter clockwise, i.e., in the opposite direction with respect to the first transfer wheel 146.

In the present embodiment, the tray-like elements 2 comprise a number of seats, each apt to receive in a supporting manner a capsule 10 in an upright position, which is equal to the number of capsules 10 transported by the first pincer device, i.e. two in the present example.

Said seats are defined by respective recesses 3 that receive the bottom of a single capsule, thus keeping it in an upright position during its movement in a predetermined position.

Each tray-like element 2 is mounted on a respective rotary moving element 4, which has a stem 6 capable of rotating about a vertical axis Y, i.e. perpendicular to the rotation plane on which said second closed transport path is located, and of translating vertically, as explained in more detail below.

In this embodiment, the rotation of the tray-like element 4 is counter clockwise, i.e. equally oriented with respect to the rotation of the second transfer wheel 147 about its respective axis B.

Figure 5:
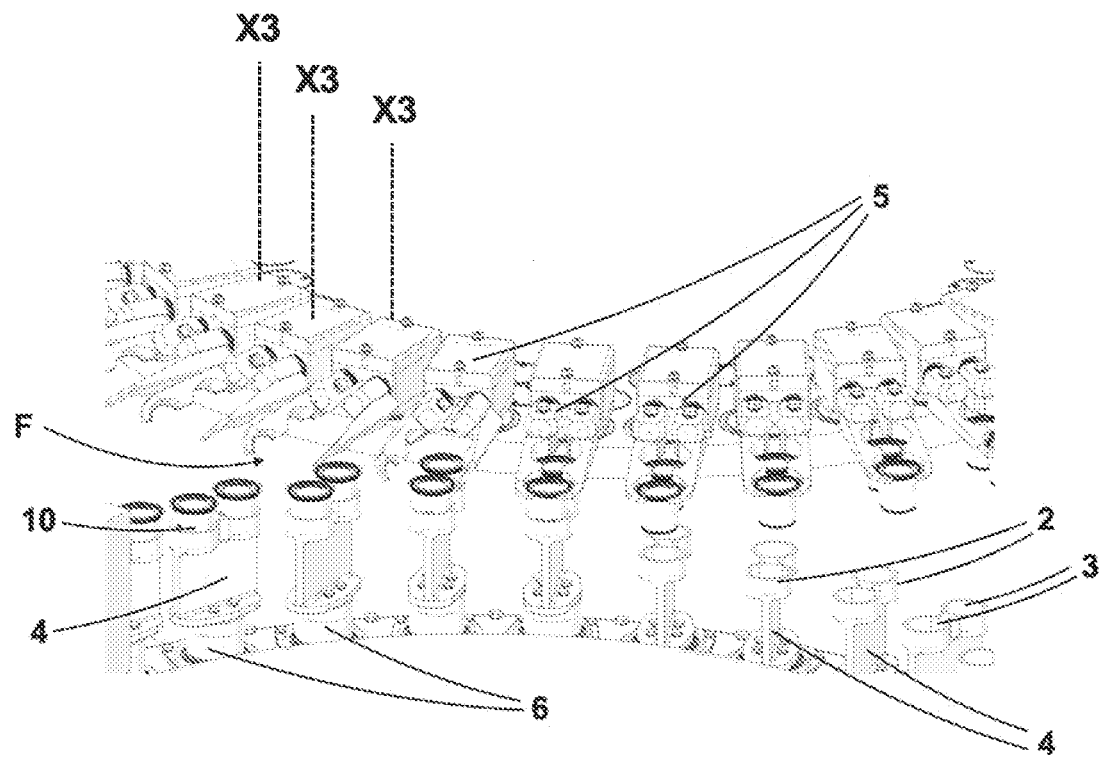
FIG. 5 shows a perspective view of a first detail of the transfer apparatus in FIG. 2.
Figure 6:
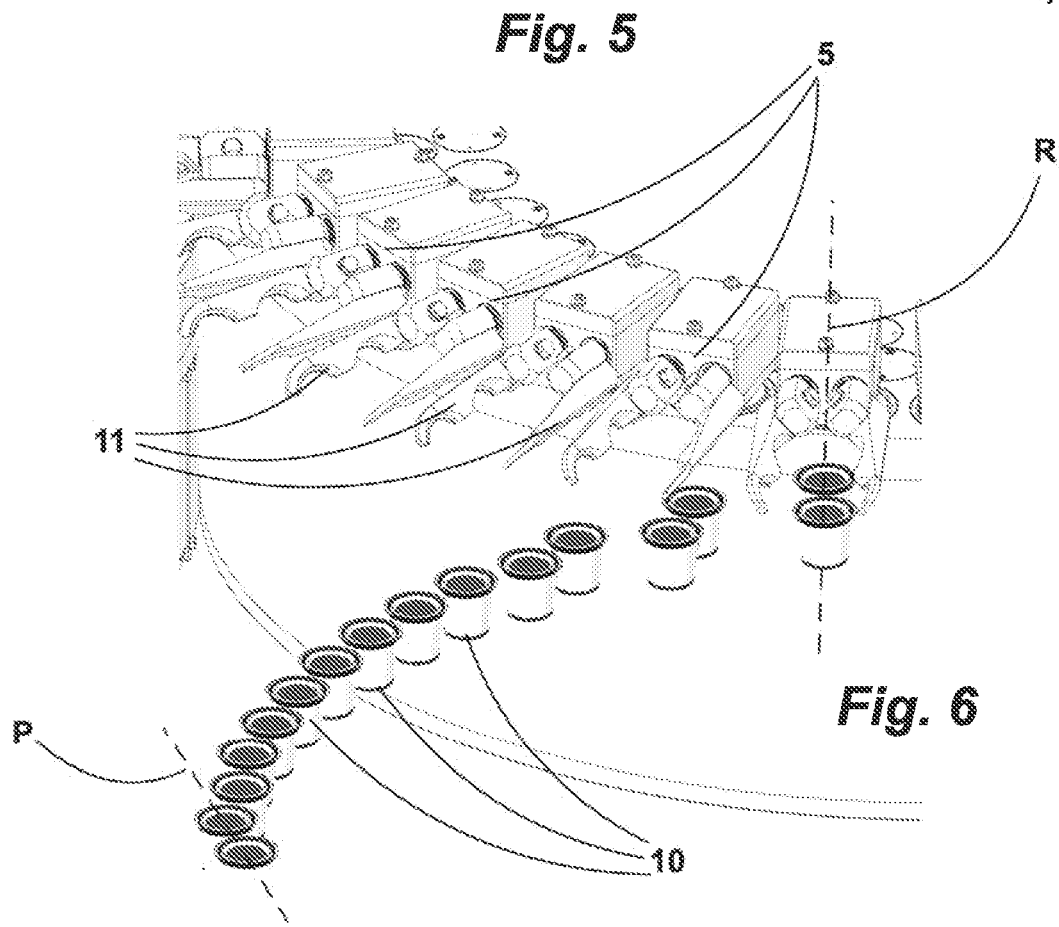
FIG. 6 shows a perspective view of a second detail of the transfer device in FIG. 2.

In this way, the recesses 3 of each tray-like element 2, keep the capsules 10 in a vertical position while the rotary moving elements 4 can be rotated from a first position R (FIG. 6) in which the recesses 3, and therefore the capsules 10, are arranged along a line that is aligned to a radial direction with respect to the second transport wheel 147, or more generally aligned in a direction substantially perpendicular to the second closed transport path, to a second position P (FIG. 5) in which the recesses 3, and therefore the capsules 10, are arranged along a line that is aligned to a circumferential direction with respect to the second transport wheel 147, or more generally aligned in a direction substantially parallel or tangential to said second closed transport path, and vice versa.

Therefore, the tray-like elements 2 will receive the capsules 10 from the first pincer devices 1 since they are in said first position R, and then subsequently rotate to said second position P.

Figure 3:
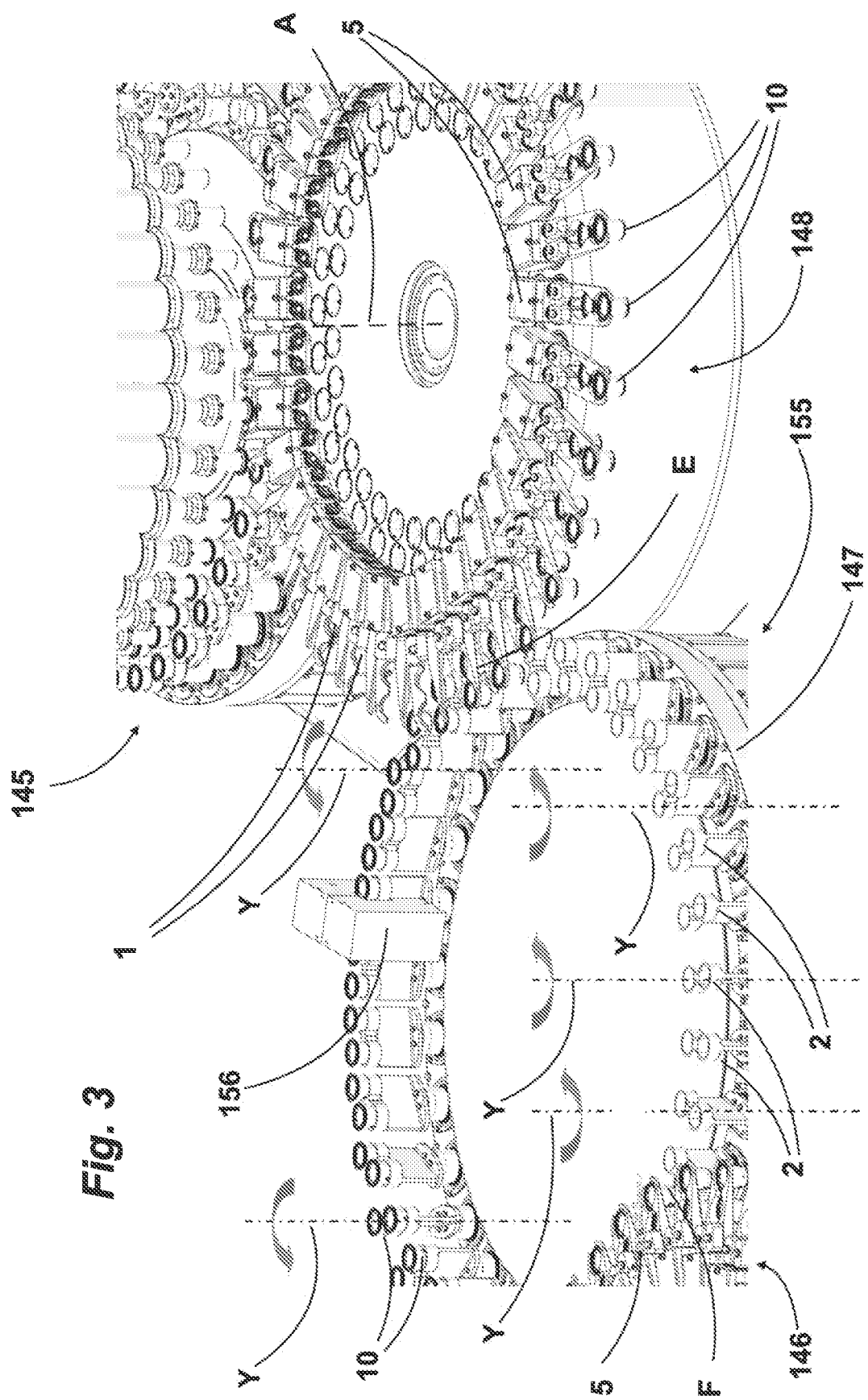
FIG. 3 shows a partial perspective view of the transfer apparatus of FIG. 2, from a first angle.

In this way, the capsules pass through the weighing device 156 in a single line corresponding to the peripheral circumference of the second transfer wheel 147 (FIGS. 2 to 4).

Once having passed through said weighing device 156, the rotary moving elements 4 will rotate again, i.e. in the present example they will continue in their rotation, bringing the tray-like elements 2 and the respective capsules 10 back to said first position R at the opposite second outlet end F (FIG. 5) of the second arc-shaped transport path of the second transfer wheel 147.

At this end F, the second closed transport path intersects a third closed transport path which is associated with said third transfer wheel 148, which, like the first transfer wheel 146, comprises a respective third rotary drum on the periphery of which a plurality of second pincer devices 5 are positioned, which are then transported along the third closed transport path of circular shape, wherein they receive the capsules 10 from the second closed transport system associated with the second transfer wheel 147.

Each second pincer device 5 is therefore arranged to grip the capsules 10 on the tray-like elements 2 which, being in said first position R, shows the capsules 10 arranged in two substantially concentric lines.

Therefore, each second pincer device 5 grips two capsules 10 at a time.

Each tray-like element 2 comprises a respective, independent lifting mechanism comprising said stem 6 and an actuating device, arranged internally to the second rotary drum.

The actuating device may for example consist of an electric motor, rotary or linear, which raises and lowers the tray-like element 2 according to instructions linked to the rotation of the drum, i.e. a so-called electronic cam.

However, it is understood that an entirely mechanical solution is also possible, with the lower end of each stem 6 acting as a cam follower, in contact with a fixed cam arranged within the second rotary drum.

The lifting mechanism described herein operates at the exchange segments, which extend along the second closed transport path of the tray-like elements 2, over a certain circular arc before and after the inlet and outlet ends E and F.

In the aforesaid exchange segment, therefore, not only the tray-like element 2 is rotated so as to assume said first radial position R, but it is translated approaching the pincer devices 1, 5 of the first and third transfer wheel 146, 148, at a gripping level.

When, on the other hand, the tray-like elements 2 are not in said exchange segments, and in particular when they are rotated to assume said second circumferential position P, they are translated to a weighing level, so that the crossing of the weighing device 156 occurs with the capsules all at the same level, which is determined by the fact that the capsules 10 are resting in the respective recess 3 of the tray-like element 2.

Said translation may comprise lifting to the gripping level and lowering to the weighing level, or vice versa.

The pincer device will be described below with reference to FIG. 8, which shows the first pincer device 1, but the same description also applies to the second pincer device 5, which is structurally and functionally identical thereto.

It has a pair of gripping claws 11 that project outward in a substantially radial direction, with respect to the respective circular transport path, from the respective drum of the transfer wheel 146.

The gripping claws 11 cooperate with each other for gripping and releasing the capsules 10, operating in pairs in the present embodiment. Each gripping claw 11 comprises a proximal end 12 and a distal end 13, a gripping edge 14 facing the gripping edge 14 of the other claw 11, and a longitudinal development according to a predefined respective direction X1, so that the predefined directions X1 of both claws 11 define a gripping plane.

Preferably the predefined directions X1 of both claws 11 define a gripping plane.

When the claws 11 are in a coplanar position, i.e. when their respective gripping edges 14 face each other at a minimum spacing to perform the gripping of the capsules 10, a gripping plane of the capsules 10 is defined.

The pincer device 1 further comprises a driving mechanism comprising at least one rotary actuator, connected to a respective proximal end, arranged internally to a casing 20 from which said gripping claws 11 branch out frontally; the casing 20 is arranged on the periphery of the transfer wheel 146.

The rotary actuator is provided to rotate each gripping claw 11 from a gripping position to a release position by rotating it about a respective rotation axis X2, as will be explained in more detail below.

Figure 8:
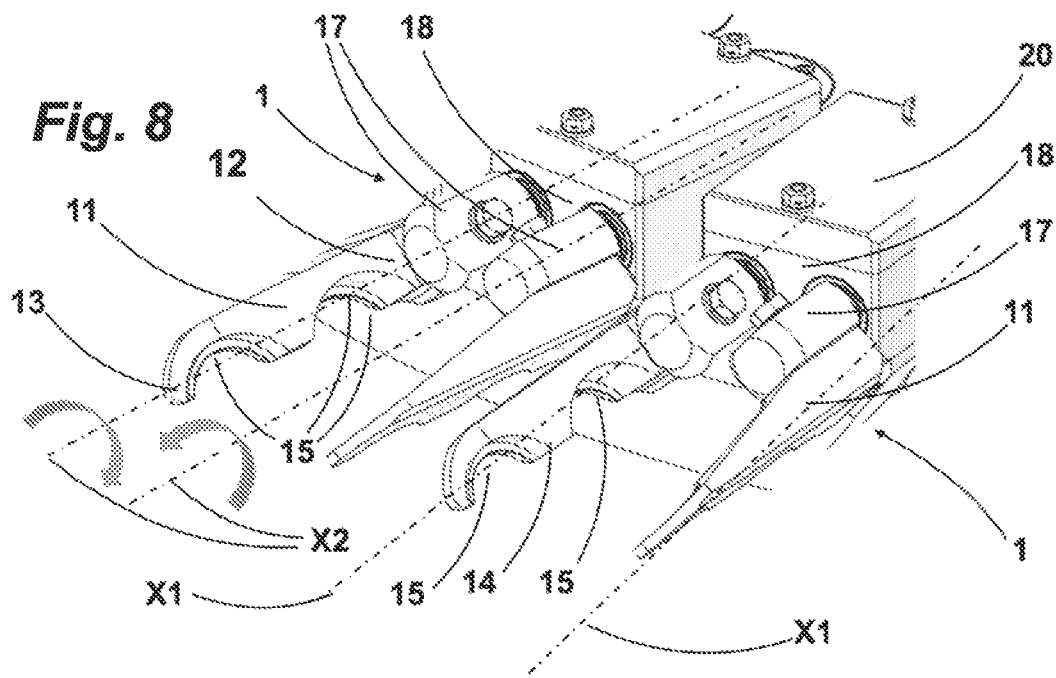
FIG. 8 shows a perspective view of a pair of pincer devices of the transfer apparatus of FIG. 2, made according to the present invention.

Preferably, the rotation axes X2 define a respective rotation plane (FIG. 8).

It should be noted that the gripping plane of the gripping claws 11 and the rotation plane determined by their rotation are substantially parallel or coincident based on the position of the gripping claws 11 which, as they rotate, rise and are lowered.

In the gripping position, the gripping edges 14 of the two gripping claws 11 of the pincer device 1 have a minimum spacing between them which increases by rotating the gripping claws 11 outwards, in two opposite directions of rotation, away from each other until said release position is reached.

Note that, in the present example, the rotation axes X2 are substantially parallel to each other.

In the present example, each gripping claw 11 rotates in such a way as to shift downwards, so that, in the released position, the two claws are in a cutting position with respect to the rotation plane.

The rotary actuator comprises, for each gripping claw 11, a rotary pin 17 projecting from a front wall 18 of said casing 20.

Each rotary pin defines a respective rotation axis X2 (FIG. 8), which extends in a direction that is concordant with the predefined direction of development X1 of the claws 11.

Thus, each claw 11 does not rotate about an axis perpendicular to the plane on which they are located, i.e. about a rotation pin that is perpendicular to their development, as happens in a classic jaw pincer configuration.

Instead, each claw 11 rotates about a longitudinal axis with respect to the extension of the claws 11.

In particular, the direction of longitudinal development X1 and the rotation axis X2 are substantially parallel, or diverge by a minimum angle, i.e. such that, when the two claws 11 are raised and approached in the gripping position, they are at the minimum mutual spacing, which increases progressively as the claws 11 are rotated substantially about themselves.

Each pin 17 can be connected to any type of drive of the rotary actuator. For example, the casing 20 may contain an electric motor that is electronically controlled so as to precisely determine the gripping and release positions and the respective rotations. A single motor can be provided to drive the rotation of both claws 11 or two separate motors can be provided.

Otherwise, there may be a control kinematic mechanism associated with the rotation of the rotary drum of the respective transfer wheel, which may comprise a cam drive through rods that are connected to a shaft driving the rotating pin 17.

Otherwise, the transfer device 200 may comprise, for each transfer wheel 146, 148, a dedicated motor, on board the respective rotary drum, which presides over the correct rotation of the gripping claws 11.

Figure 7:
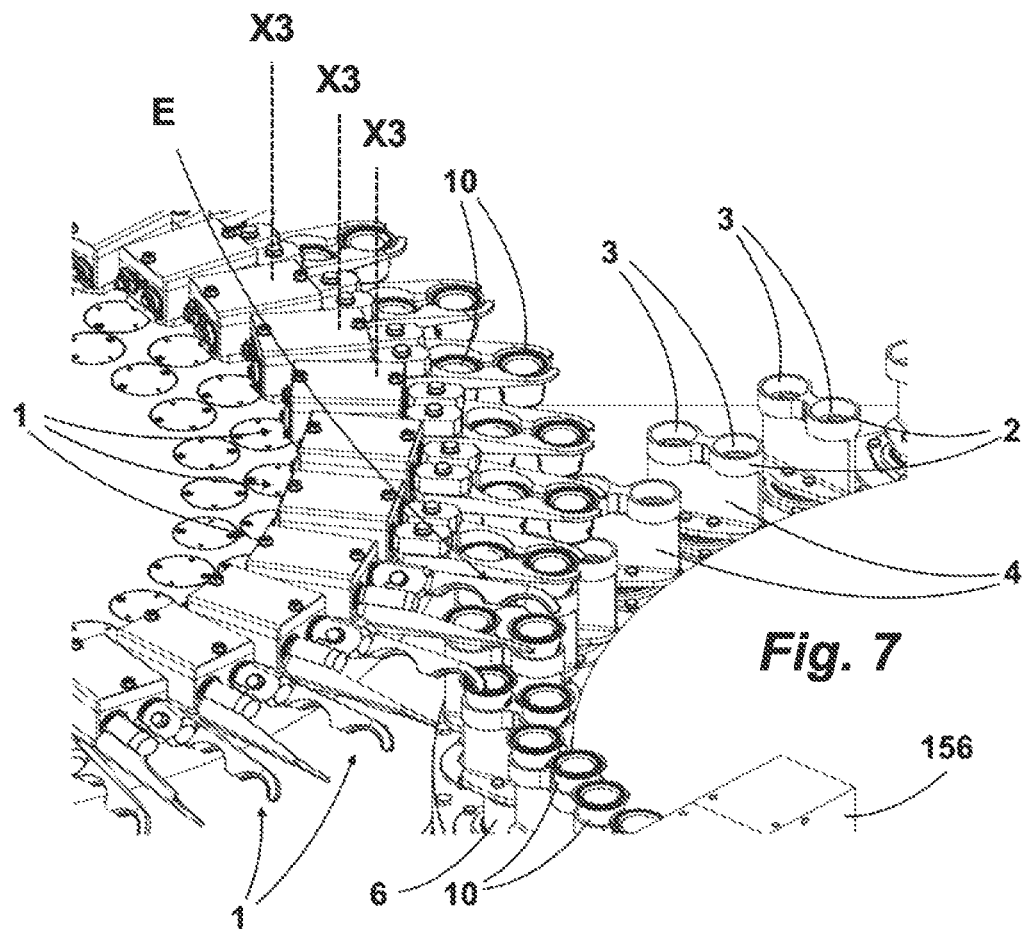
FIG. 7 shows a perspective view of a third detail of the transfer apparatus of FIG. 2.

The rotary actuator of the first or second pincer device 1, 5 is further provided to rotate it about a vertical axis X3 (FIGS. 5 and 7), i.e. perpendicular to the plane on which the respective transport path is located, with a movement that can be adjusted to ease the transfer of the capsules 10 from the first pincer devices 1 or the second pincer devices 5, to accompany the respective transferring or receiving element.

This rotation can also be implemented by means of an electronic or mechanical cam, and possibly a dedicated motor.

Each gripping edge 14 has, in the present embodiment, a pair of recesses 15, apt to cooperate with the corresponding recesses of the gripping edge 14 of the claw 11 facing it to form, in said gripping position, a pair of gripping clamps that simultaneously grip and release two capsules 10.

It is understood that the number of recesses 15 depends on the number of articles that, in general, the pincer device 1 will have to grip, and therefore may be one or more.

In particular, each recess 15 has a curved profile that is apt to be connected to the shape of either the article or the articles to be gripped, in this case capsules 10, in a predetermined area.

It is understood, however, that the shape of the profile can be adapted to whatever shape is preferred to create a better grip with the article to be gripped and transferred into the transfer device.

The curved profile of this embodiment has an upper support edge, formed on the surface of the gripping claw 11 facing upwards in the gripping position, which is provided to cooperate in a supporting manner with a projection of the chasuble 10, for example a shoulder present on the upper edge of the capsule 10.

To the above-described gripper device and the relevant transfer device for articles, a person skilled in the art may, to meet additional and contingent requirements, make numerous further modifications and variations, all of which are, however, within the scope of protection of the present invention as defined by the appended claims.

The invention claimed is:

1. A pincer device for gripping and releasing articles in a transfer step from an operating station to a subsequent station, the pincer device comprising:
    a pair of gripping claws, cooperating with each other and having each a proximal end and a distal end, a gripping edge facing the gripping edge of an opposite gripping claw, and a longitudinal profile following a predefined respective direction; and
    a driving mechanism, comprising at least one rotary actuator connected to a respective proximal end of a gripping claw, configured to rotate each gripping claw from a gripping position to a release position by rotating each gripping claw about a rotation axis parallel to the predefined respective direction,
    wherein, in the gripping position, the gripping edges have a minimum spacing therebetween, progressively increasing towards said release position,
    wherein each gripping edge has at least one recess configured to cooperate with a corresponding facing recess of the gripping edge to form, in said gripping position, a gripping clamp,
    wherein each recess has a profile configured to be connected to a shape of an article or articles to be gripped in a predetermined area, and
    wherein said profile is curved and has an upper support edge, formed on a surface of the gripping claw facing upwards in the gripping position, configured to cooperate in a supporting manner with a projection of a respective article.

2. The pincer device according to claim 1, wherein the rotation axes are substantially parallel to each other.

3. The pincer device according to claim 1, wherein the gripping claws are configured to rotate in directions opposite to each other.

4. The pincer device according to claim 3, wherein the gripping edge of each gripping claw is configured to rotate by shifting downwards, to reach the release position.

5. The pincer device according to claim 1, wherein each gripping edge has two or more of said recesses in a sequence, to form two or more gripping clamps gripping and releasing two or more articles at the same time.

6. A transfer apparatus comprising a plurality of the pincer devices according to claim 1, moving along a closed path having:
    a gripping segment, wherein the gripping claws rotate from the release position to the gripping position, and
    a release segment, wherein the gripping claws rotate from the gripping position to the release position, in which the gripping claws of the gripping devices project outward from said closed path.

7. The transfer apparatus according to claim 6, wherein said closed path is a circular path formed on a carousel transfer wheel, having a respective rotary drum, wherein the gripping claws project outward from the circular path in a substantially radial direction.

8. A packaging apparatus, comprising at least one transfer apparatus according to claim 6.

* * * * *